US012686395B2

(12) United States Patent
Yautz

(10) Patent No.: US 12,686,395 B2
(45) Date of Patent: Jul. 21, 2026

(54) PRECIPITATION RATE DETERMINATION FOR AUTONOMOUS VEHICLES

(71) Applicant: ARGO AI, LLC, Pittsburgh, PA (US)

(72) Inventor: Dustin Yautz, Pittsburgh, PA (US)

(73) Assignee: Volkswagen Group of America Investments, LLC, Reston, VA (US)

( * ) Notice: Subject to any disclaimer, the term of this patent is extended or adjusted under 35 U.S.C. 154(b) by 218 days.

(21) Appl. No.: 18/514,337

(22) Filed: Nov. 20, 2023

(65) Prior Publication Data

US 2024/0199038 A1 Jun. 20, 2024

Related U.S. Application Data

(60) Provisional application No. 63/427,654, filed on Nov. 23, 2022.

(51) Int. Cl.
B60W 50/00 (2006.01)
G01S 17/95 (2006.01)

(52) U.S. Cl.
CPC ......... B60W 50/0098 (2013.01); G01S 17/95 (2013.01); B60W 2420/408 (2024.01); B60W 2555/20 (2020.02)

(58) Field of Classification Search
CPC ....... B60W 2420/408; B60W 2555/20; B60W 50/0098; B60W 2050/0075; B60W 40/02; B60W 40/06; G01S 17/95; G01S 17/931
See application file for complete search history.

(56) References Cited

U.S. PATENT DOCUMENTS

| | | | |
|---|---|---|---|
| 7,551,095 B2 | 6/2009 | Veerasamy | |
| 9,871,290 B1 | 1/2018 | DeMersseman | |
| 10,049,284 B2 | 8/2018 | Jain et al. | |
| 10,427,645 B2 | 10/2019 | Karandikar et al. | |
| 10,780,861 B2 | 9/2020 | Herman et al. | |
| 11,167,726 B2 | 11/2021 | Hu et al. | |
| 11,858,524 B1 * | 1/2024 | Ho ...................... | B60W 50/045 |
| 2015/0168556 A1 * | 6/2015 | Zhu ....................... | G01S 13/865 |
| | | | 701/28 |

(Continued)

FOREIGN PATENT DOCUMENTS

CN 110084218 A 8/2019

OTHER PUBLICATIONS

Simulation_of_road_vehicle_natural_environment_in_a_climatic_wind_tunnel. (Year: 2000).*

(Continued)

*Primary Examiner* — Wade Miles
*Assistant Examiner* — Jerrod Irvin Davis

(57) ABSTRACT

Disclosed herein are system, method, and computer program product embodiments for determining a precipitation rate. In some embodiments, a processor receives precipitation data from an array of sensors of a set of array of sensors disposed on a vehicle. A set of lidar sensors are disposed on the vehicle and the array of sensors is positioned within a predetermined distance of a respective lidar sensor of the set of lidar sensors. The processor generates a precipitation rate based on an average of the precipitation data received from the array of sensors and trains a model to control a function of the vehicle during precipitation using the precipitation rate.

20 Claims, 11 Drawing Sheets

(56) References Cited

U.S. PATENT DOCUMENTS

| | | | |
|---|---|---|---|
| 2020/0064483 A1* | 2/2020 | Li | G01S 13/867 |
| 2023/0251384 A1* | 8/2023 | Gangundi | G01S 7/497 |
| | | | 356/4.01 |

OTHER PUBLICATIONS

Choi, K. N., "Omni-directional Rain Sensor utilizing Scattered Light Reflection by Water Particle on Automotive Windshield Glass", IEEE, 2011.

Gormer, S., et al., "Vision-based Rain Sensing with an In-Vehicle Camera", IEEE 2009.

* cited by examiner

Mounting Plate

Rain Sensor

RAM Mount

Non-marring Magnetic Mounts

Clamped onto front grill.

One set mounted low to capture road spray.

900

Receive precipitation data from an array of sensors

902

Generate a precipitation rate and droplet size

904

Train a model to control a function of the vehicle

906

PRECIPITATION RATE DETERMINATION FOR AUTONOMOUS VEHICLES

BACKGROUND

Autonomous vehicle (AV) technology often requires precipitation readings to accurately control functions of the AV. Conventionally, laser disdrometers are used to measure rain rates and droplet sizes. However, laser distrometers have several disadvantages. For example, laser disdrometers determine droplet volume on the assumption that the droplet falls perpendicular to a scan plane, which is not applicable when the vehicle is in motion. Furthermore, laser disdrometers are bulky and are not able to be placed proximate to AV sensors (e.g., lidar sensors). Moreover, laser disdrometers' scan areas are relatively small, making real-time measurements highly variable, necessitating either more scans or propagating large amounts of variation.

When using AV technology, the rain rate may vary significantly based on location, speed, and interaction with the environment. For example, vehicles traveling at different speeds will experience different localized rain rates on the bumper as compared to the roof. Furthermore, the rain rate will vary based on the vehicle's speed and distance to other objects. As such, given the laser disdrometers disadvantages, laser disdrometers may not provide accurate precipitation readings with respect to AV applications.

Other rain sensors, such as automotive rain sensors, are primarily used for triggering windshield wipers. The automotive rain sensors detect droplets on the windshield. However, these sensors do not determine the rain rate with respect other areas of the vehicle.

In view of the above, conventional systems provide ineffective and inaccurate methods for determining precipitation readings for AV technology.

SUMMARY

Aspects described herein include a computer-implemented method for determining a precipitation rate. The method comprises receives precipitation data from an array of sensors of a set of array of sensors disposed on a vehicle. A set of lidar sensors are disposed on the vehicle and the array of sensors is positioned within a predetermined distance of a respective lidar sensor of the set of lidar sensors. The method further comprises generating a precipitation rate based on an average of the precipitation data received from the array of sensors and training a model to control a function of the vehicle during precipitation using the precipitation rate.

Aspects described herein further include a system for determining a precipitation rate. The system comprises a memory and a processor coupled to the memory. The processor is configured to receive precipitation data from an array of sensors of a set of array of sensors disposed on a vehicle. A set of lidar sensors are disposed on the vehicle and the array of sensors is positioned within a predetermined distance of a respective lidar sensor of the set of lidar sensors. The processor is further configured to generate a precipitation rate based on an average of the precipitation data received from the array of sensors and train a model to control a function of the vehicle during precipitation using the precipitation rate.

Aspects described herein further include a non-transitory computer-readable medium having instructions stored thereon that, when executed by at least one computing device, cause the at least one computing device to perform operations. The operations comprise receiving precipitation data from an array of sensors of a set of array of sensors disposed on a vehicle. A set of lidar sensors are disposed on the vehicle and the array of sensors is positioned within a predetermined distance of a respective lidar sensor of the set of lidar sensors. The operations further comprise generating a precipitation rate based on an average of the precipitation data received from the array of sensors and training a model to control a function of the vehicle during precipitation using the precipitation rate.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
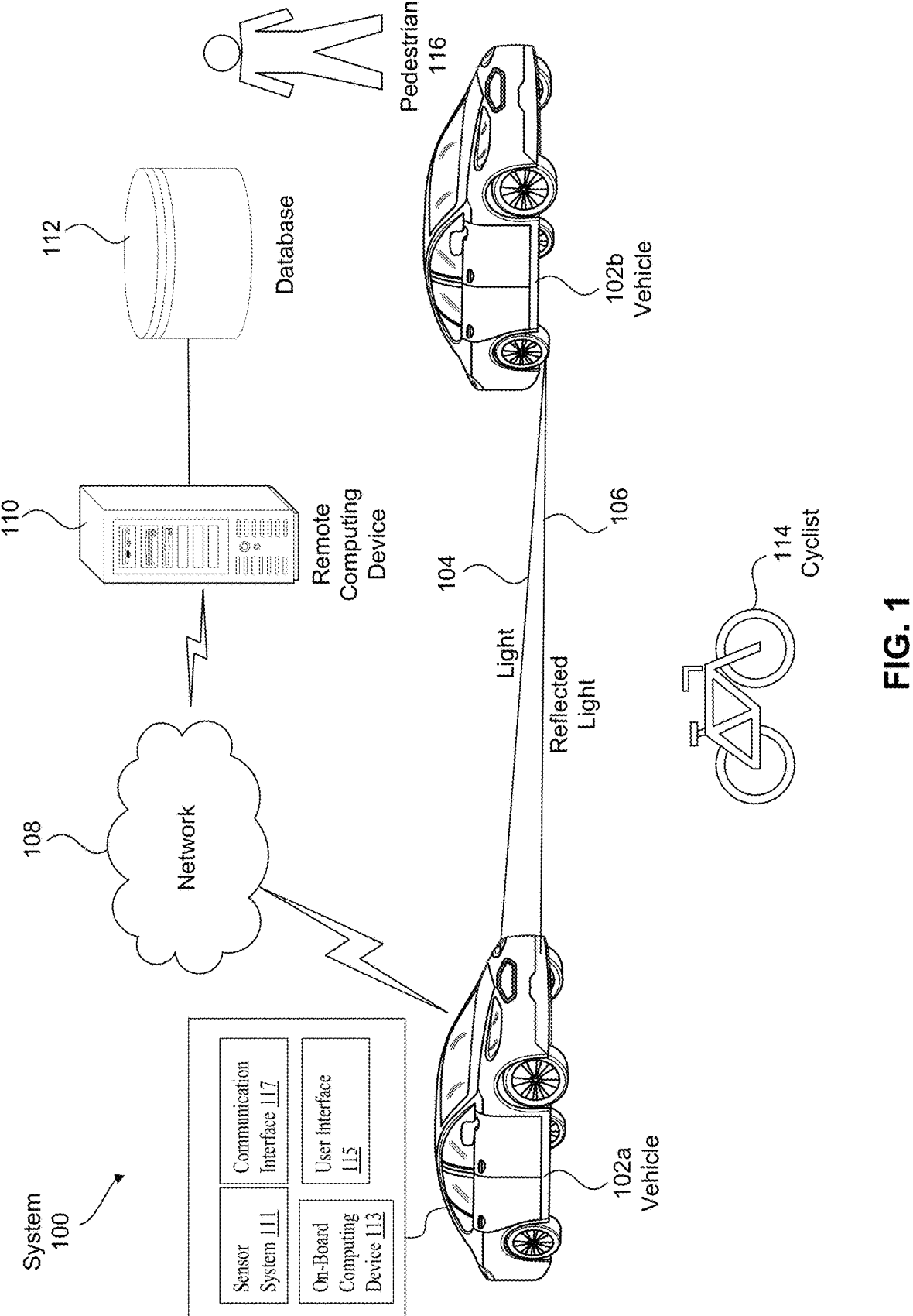
FIG. 1 illustrates an exemplary autonomous vehicle system, in accordance with aspects of the disclosure.

Provided herein are system, apparatus, device, method and/or computer program product embodiments, and/or combinations and sub-combinations thereof, for determining a precipitation rate.

Accurate reading or measurement of precipitation for an autonomous vehicle (AV) can be important for controlling functions of the AV. There are two major challenges in designing a system to operate in wet environmental conditions: 1) measuring the intensity of the water in the environment (quantifying) and 2) determining when that intensity is too much for the sensor to operate (thresholding).

In most applications accurately measuring the size and amount of water in the air is typically done with laser disdrometers (as used in meteorology and weather stations), which can measure rain rates and droplet sizes. This works well on average, but in an AV application, the rain rate can vary significantly based on location, speed, and interaction with the environment. For example, a vehicle traveling at different speeds will experience different localized rain rates on the bumper vs on the roof and those effective rain rates will vary further based on the vehicle's speed and relative distance to other objects.

Traditionally, automotive rain sensors exist primarily to trigger windshield wipers, as a convenience feature for drivers. These sensors use IR transmitters and receivers to detect the intensity loss caused by droplets on a small section of the windshield. These rain sensors provide information about the area that a driver cares about, the windshield, but are not representative of the effective rain rate in other areas of the vehicle (e.g.: bumper, fender, roof) where AV sensors would be located.

The primary solution for AVs is in training detection algorithms on individual sensors. Given how dramatically the effective rain rates can vary based on the location on the vehicle, it's critical to determine what the effective rain rate is for that specific sensor at that specific time, in that specific environment.

Many AV companies have started to install laser disdrometers on their vehicles to determine what the effective rain rate is. The drawbacks to this method are: 1) the calculation that laser disdrometers use to calculate droplet volume is based on a droplet falling perpendicular to the scan plane, which is not feasible on a moving vehicle and 2) the scan area for the disdrometer is very small, using many more samples (and therefore travel distance when in motion) to determine the rain rate.

However, traditional approaches based on laser disdrometers or simple automotive rain sensors alone cannot solve the problem to the desired accuracy. Aspects described herein address the problems with respect to determining a precipitation rate by using an array of sensors coupled to a vehicle to determine localized and real time rain rate measurement for testing and data collection. In some embodiments, a processor receives precipitation data from an array of sensors of a set of array of sensors disposed on a vehicle. A set of lidar sensors is disposed on the vehicle and the array of sensors is positioned within a predetermined distance of a respective lidar sensor of the set of lidar sensors. The processor generates precipitation rate based on an average of the precipitation data received from the array of sensors and trains a model to control a function of the vehicle during precipitation using the precipitation rate.

The array of sensors amplifies the amount of precipitation data that is collected and is small enough to be located close to a lidar sensor of the set of lidar sensors on the vehicle. Furthermore, the aspects described herein provide high resolution, localized readings for training lidar sensor models to control the function of the vehicle during precipitation (e.g., rain, snow, ice, etc.).

The precipitation data collected by the array of sensors may be used to train models implemented in AV applications. Furthermore, the precipitation data may be used to validate data collected by other sensors (e.g., lidar sensors) disposed on the AV.

In this regard, the term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. AV is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

Notably, the present solution is being described herein in the context of an autonomous vehicle. However, the present solution is not limited to autonomous vehicle applications. The present solution may be used in other applications such as robotic applications, radar system applications, metric applications, and/or system performance applications.

Embodiments herein may utilize the technology to create small clusters of rain sensors around each of the sensor areas of interest, where these rain sensor clusters can be referred to as "sensor arrays".

Each sensor array contains several rain sensors that are used 1) amplify the amount of data collected and avoid the 'law of small numbers' problem by increasing the surface area and 2) are small and flexible enough to be located close to the AV sensor.

These sensors are primarily used to collect the data to train the sensor models. It's not typically feasible to employ these sensors long-term because of 1) cost when scaled across a fleet, 2) additional power, processing, and packaging costs, 3) the additional equipment to clean the sensor long-term, and 4) the sensitivity of technology to significant changes in ambient IR noise.

Using the sensor arrays for short-term measurements avoids the long-term drawbacks, but provides high resolution, localized readings needed to train sensor models to be used as long-term solutions.

Embodiments herein can allow localized and real time rain rate measurement for testing and data collection. The rain sensors used in other typical implementations are typically limited to roof mounting and are significantly lose accuracy when taking measurements while in-motion.

The design solution can be limited and countered in the following ways:

The technology is sensitive to ambient IR noise (primarily from the sun) so changes in sun location and intensity can impact results.

Testing in consistent or minimal sunlight helps to reduce the error from this technological flaw.

Packing the sensor array too closely to the sensor-under-test can impact the aerodynamics of the vehicle and change how many droplets impact the lens.

Keeping the sensor array outside of the sensor field-of-view or on another vehicle (experiencing the same environmental factors) helps reduce this error.

These sensors may only measure droplets on the lens of the rain sensor, not droplets in the air (which can also obscure the detection of objects).

This is resolved either a) by generating a controlled and known amount of rain in the air or b) measuring the average rain in the air using another rain sensor (or series of sensors), such as a stationary laser disdrometer off-vehicle.

FIG. 1 illustrates an exemplary autonomous vehicle system 100, in accordance with aspects of the disclosure. System 100 comprises a vehicle 102a that is traveling along a road in a semi-autonomous or autonomous manner. Vehicle 102a is also referred to herein as AV 102a. AV 102a can include, but is not limited to, a land vehicle (as shown in FIG. 1), an aircraft, or a watercraft.

AV 102a is generally configured to detect objects 102b, 114, 116 in proximity thereto. The objects can include, but are not limited to, a vehicle 102b, cyclist 114 (such as a rider of a bicycle, electric scooter, motorcycle, or the like) and/or a pedestrian 116.

As illustrated in FIG. 1, the AV 102a may include a sensor system 111, an on-board computing device 113, a communications interface 117, and a user interface 115. Autonomous vehicle 101 may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

Figure 2:
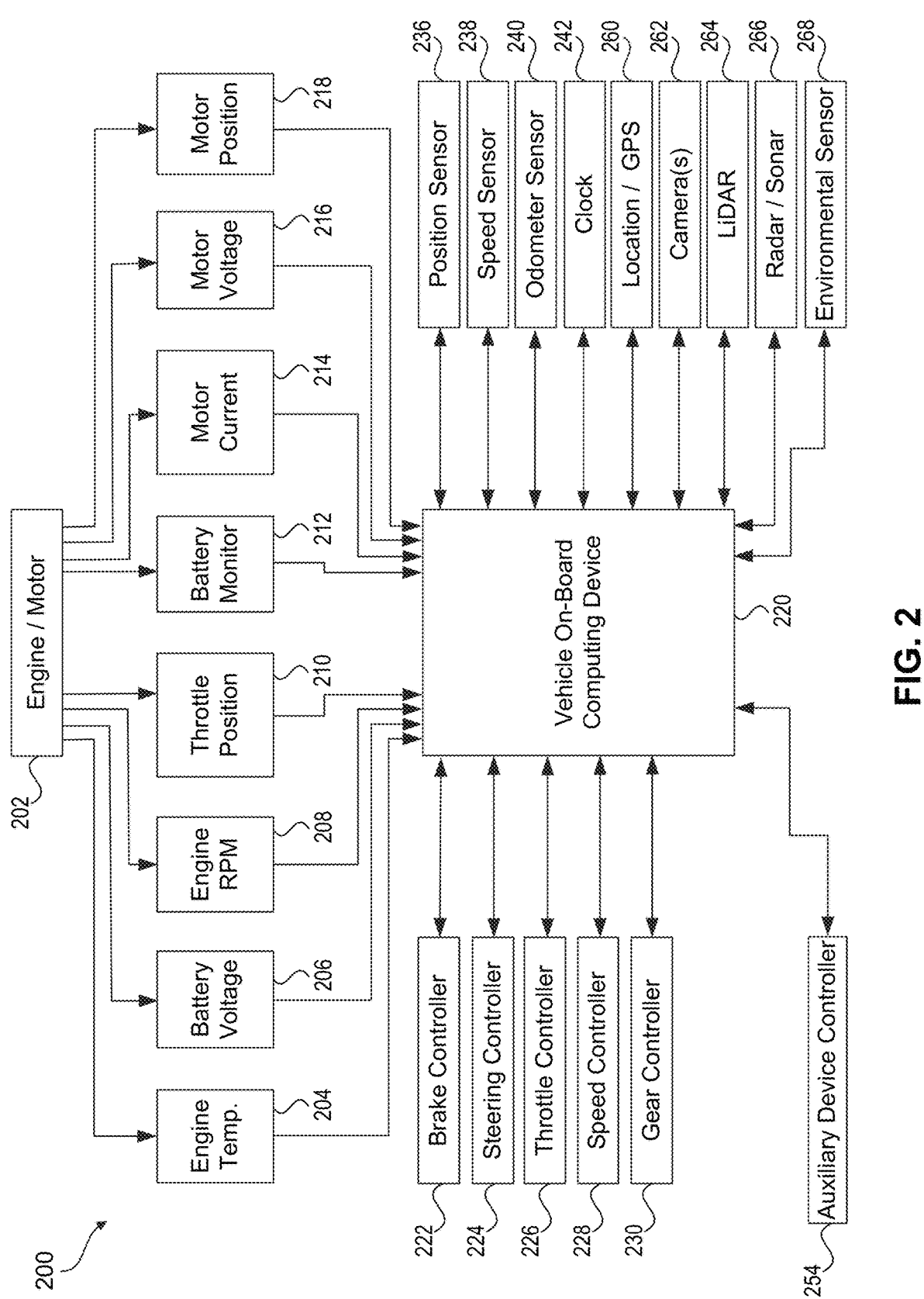
FIG. 2 illustrates an exemplary architecture for a vehicle, in accordance with aspects of the disclosure.

The sensor system 111 may include one or more sensors that are coupled to and/or are included within the AV 102a, as illustrated in FIG. 2. For example, such sensors may include, without limitation, a lidar system, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface.

As will be described in greater detail, AV 102a may be configured with a lidar system, e.g., lidar system 264 of FIG. 2. The lidar system may be configured to transmit a light pulse 104 to detect objects located within a distance or range of distances of AV 102a. Light pulse 104 may be incident on one or more objects (e.g., AV 102b) and be reflected back to the lidar system. Reflected light pulse 106 incident on the lidar system may be processed to determine a distance of that object to AV 102a. The reflected light pulse may be detected using, in some embodiments, a photodetector or array of photodetectors positioned and configured to receive the light reflected back into the lidar system. Lidar information, such as detected object data, is communicated from the lidar system to an on-board computing device, e.g., on-board computing device 220 of FIG. 2. The AV 102a may also communicate lidar data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

It should be noted that the lidar systems for collecting data pertaining to the surface may be included in systems other than the AV 102a such as, without limitation, other vehicles (autonomous or driven), robots, satellites, etc.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber opticbased network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102a and external systems, such as, for example, external devices, sensors, other vehicles, servers, data stores, databases etc. The communications interface 117 may utilize any now or hereafter known protocols, protection schemes, encodings, formats, packaging, etc. such as, without limitation, Wi-Fi, an infrared link, Bluetooth, etc. The user interface system 115 may be part of peripheral devices implemented within the AV 102a including, for example, a keyboard, a touch screen display device, a microphone, and a speaker, etc.

FIG. 2 illustrates an exemplary system architecture 200 for a vehicle, in accordance with aspects of the disclosure. Vehicles 102a and/or 102b of FIG. 1 can have the same or similar system architecture as that shown in FIG. 2. Thus, the following discussion of system architecture 200 is sufficient for understanding vehicle(s) 102a, 102b of FIG. 1. However, other types of vehicles are considered within the scope of the technology described herein and may contain more or less elements as described in association with FIG. 2. As a non-limiting example, an airborne vehicle may exclude brake or gear controllers, but may include an altitude sensor. In another non-limiting example, a water-based vehicle may include a depth sensor. One skilled in the art will appreciate that other propulsion systems, sensors and controllers may be included based on a type of vehicle, as is known.

As shown in FIG. 2, system architecture 200 includes an engine or motor 202 and various sensors 204-218 for measuring various parameters of the vehicle. In gas-powered or hybrid vehicles having a fuel-powered engine, the sensors may include, for example, an engine temperature sensor 204, a battery voltage sensor 206, an engine Rotations Per Minute ("RPM") sensor 208, and a throttle position sensor 210. If the vehicle is an electric or hybrid vehicle, then the vehicle may have an electric motor, and accordingly includes sensors such as a battery monitoring system 212 (to measure current, voltage and/or temperature of the battery), motor current 214 and voltage 216 sensors, and motor position sensors 218 such as resolvers and encoders.

Operational parameter sensors that are common to both types of vehicles include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also includes various sensors that operate to gather information about the environment in which the vehicle is traveling. These sensors may include, for example: a location sensor 260 (e.g., a Global Positioning System ("GPS") device); object detection sensors such as one or more cameras 262; a lidar system 264; and/or a radar and/or a sonar system 266. The sensors also may include environmental sensors 268 such as a precipitation sensor and/or ambient temperature sensor. The object detection sensors may enable the vehicle to detect objects that are within a given distance range of the vehicle 200 in any direction, while the environmental sensors collect data about environmental conditions within the vehicle's area of travel.

During operations, information is communicated from the sensors to a vehicle on-board computing device 220. The on-board computing device 220 may be implemented using the computer system of FIG. 12. The vehicle on-board computing device 220 analyzes the data captured by the sensors and optionally controls operations of the vehicle based on results of the analysis. For example, the vehicle on-board computing device 220 may control: braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers. Auxiliary device controller 254 may be configured to control one or more auxiliary devices, such as testing systems, auxiliary sensors, mobile devices transported by the vehicle, etc.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as lidar system 264 is communicated from those sensors) to the on-board computing device 220. The object detection information and/or captured images are processed by the on-board computing device 220 to detect objects in proximity to the vehicle 200. Any known or to be known technique for making an object detection based on sensor data and/or captured images can be used in the embodiments disclosed in this document.

Lidar information is communicated from lidar system 264 to the on-board computing device 220. Additionally, captured images are communicated from the camera(s) 262 to the vehicle on-board computing device 220. The lidar information and/or captured images are processed by the vehicle on-board computing device 220 to detect objects in proximity to the vehicle 200. The manner in which the object detections are made by the vehicle on-board computing device 220 includes such capabilities detailed in this disclosure.

The on-board computing device 220 may include and/or may be in communication with a routing controller 231 that generates a navigation route from a start position to a destination position for an autonomous vehicle. The routing controller 231 may access a map data store to identify possible routes and road segments that a vehicle can travel on to get from the start position to the destination position. The routing controller 231 may score the possible routes and identify a preferred route to reach the destination. For example, the routing controller 231 may generate a navigation route that minimizes Euclidean distance traveled or other cost function during the route, and may further access the traffic information and/or estimates that can affect an amount of time it will take to travel on a particular route. Depending on implementation, the routing controller 231 may generate one or more routes using various routing methods, such as Dijkstra's algorithm, Bellman-Ford algorithm, or other algorithms. The routing controller 231 may also use the traffic information to generate a navigation route that reflects expected conditions of the route (e.g., current day of the week or current time of day, etc.), such that a route generated for travel during rush-hour may differ from a route generated for travel late at night. The routing controller 231 may also generate more than one navigation route to a destination and send more than one of these navigation routes to a user for selection by the user from among various possible routes.

In various embodiments, the on-board computing device 220 may determine perception information of the surrounding environment of the AV 102a. Based on the sensor data provided by one or more sensors and location information that is obtained, the on-board computing device 220 may determine perception information of the surrounding environment of the AV 102a. The perception information may represent what an ordinary driver would perceive in the surrounding environment of a vehicle. The perception data may include information relating to one or more objects in the environment of the AV 102a. For example, the on-board computing device 220 may process sensor data (e.g., lidar or RADAR data, camera images, etc.) in order to identify objects and/or features in the environment of AV 102a. The objects may include traffic signals, road way boundaries, other vehicles, pedestrians, and/or obstacles, etc. The on-board computing device 220 may use any now or hereafter known object recognition algorithms, video tracking algorithms, and computer vision algorithms (e.g., track objects frame-to-frame iteratively over a number of time periods) to determine the perception.

In some embodiments, the on-board computing device 220 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 220 may perform one or more prediction and/or forecasting operations. For example, the on-board computing device 220 may predict future locations, trajectories, and/or actions of one or more objects. For example, the on-board computing device 220 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102a, the surrounding environment, and/or their relationship(s). For example, if an object is a vehicle and the current driving environment includes an intersection, the on-board computing device 220 may predict whether the object will likely move straight forward or make a turn. If the perception data indicates that the intersection has no traffic light, the on-board computing device 220 may also predict whether the vehicle may have to fully stop prior to enter the intersection.

In various embodiments, the on-board computing device 220 may determine a motion plan for the autonomous vehicle. For example, the on-board computing device 220 may determine a motion plan for the autonomous vehicle based on the perception data and/or the prediction data. Specifically, given predictions about the future locations of proximate objects and other perception data, the on-board computing device 220 can determine a motion plan for the AV 102a that best navigates the autonomous vehicle relative to the objects at their future locations.

In some embodiments, the on-board computing device 220 may receive predictions and make a decision regarding how to handle objects and/or actors in the environment of the AV 102a. For example, for a particular actor (e.g., a vehicle with a given speed, direction, turning angle, etc.), the on-board computing device 220 decides whether to overtake, yield, stop, and/or pass based on, for example, traffic conditions, map data, state of the autonomous vehicle, etc. Furthermore, the on-board computing device 220 also plans a path for the AV 102a to travel on a given route, as well as driving parameters (e.g., distance, speed, and/or turning angle). That is, for a given object, the on-board computing device 220 decides what to do with the object and determines how to do it. For example, for a given object, the on-board computing device 220 may decide to pass the object and may determine whether to pass on the left side or right side of the object (including motion parameters such as speed). The on-board computing device 220 may also assess the risk of a collision between a detected object and the AV 102a. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 220 may execute one or more control instructions to perform a cautious maneuver (e.g., mildly slow down, accelerate, change lane, or swerve). In contrast, if the collision cannot be avoided, then the on-board computing device 220 may execute one or more control instructions for execution of an emergency maneuver (e.g., brake and/or change direction of travel).

As discussed above, planning and control data regarding the movement of the autonomous vehicle is generated for execution. The on-board computing device 220 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Figure 3:
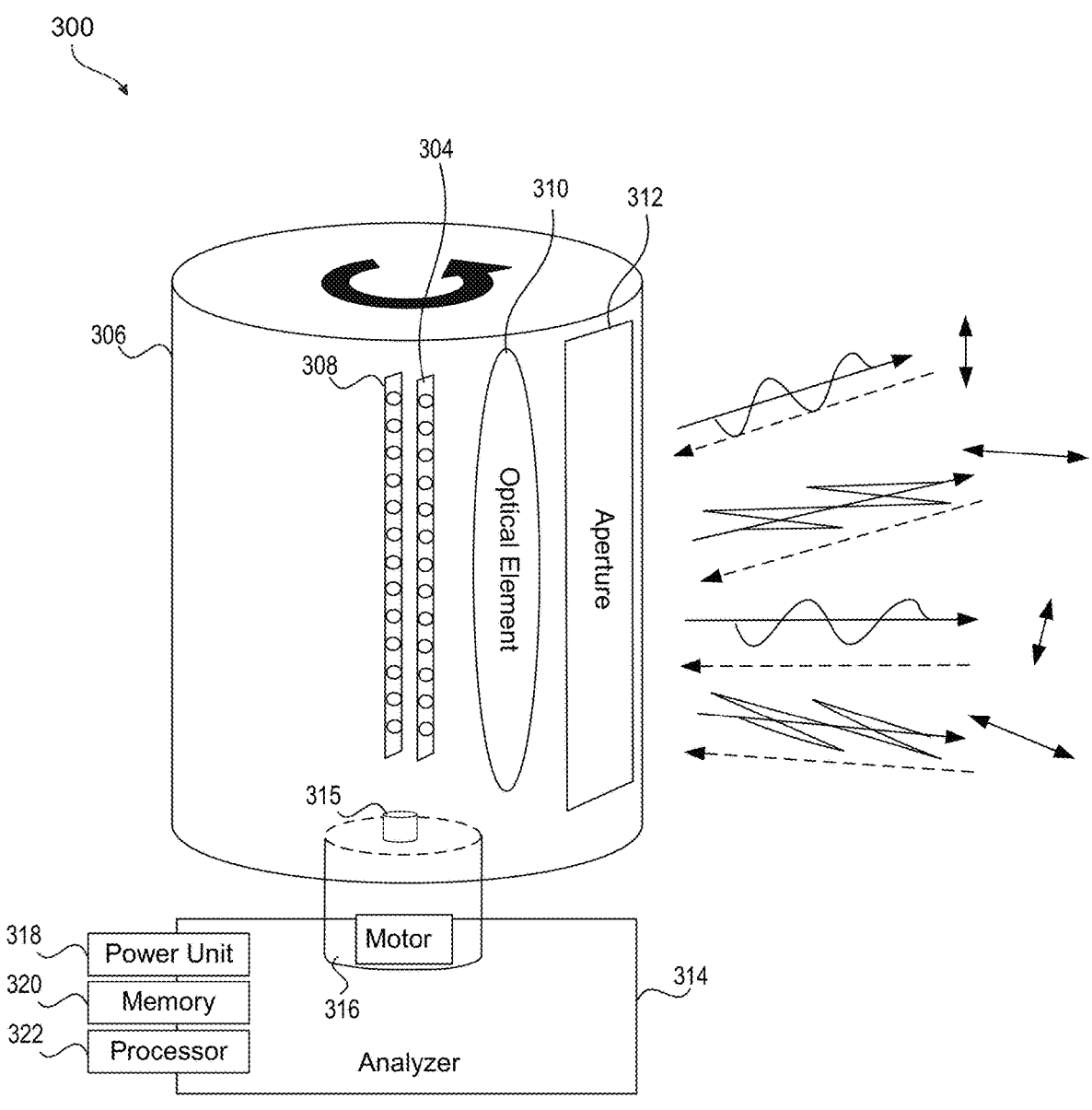
FIG. 3 illustrates an exemplary architecture for a Light Detection and Ranging ("lidar") system, in accordance with aspects of the disclosure.

FIG. 3 illustrates an exemplary architecture for a lidar system 300, in accordance with aspects of the disclosure. Lidar system 264 of FIG. 2 may be the same as or substantially similar to the lidar system 300. As such, the discussion of lidar system 300 is sufficient for understanding lidar system 264 of FIG. 2. It should be noted that the lidar system 300 of FIG. 3 is merely an example lidar system and that other lidar systems are further completed in accordance with aspects of the present disclosure, as should be understood by those of ordinary skill in the art.

As shown in FIG. 3, the lidar system 300 includes a housing 306 which may be rotatable 360° about a central axis such as hub or axle 315 of motor 316. The housing may include an emitter/receiver aperture 312 made of a material transparent to light. Although a single aperture is shown in FIG. 3, the present solution is not limited in this regard. In other scenarios, multiple apertures for emitting and/or receiving light may be provided. Either way, the lidar system 300 can emit light through one or more of the aperture(s) 312 and receive reflected light back toward one or more of the aperture(s) 312 as the housing 306 rotates around the internal components. In an alternative scenario, the outer shell of housing 306 may be a stationary dome, at least partially made of a material that is transparent to light, with rotatable components inside of the housing 306.

Inside the rotating shell or stationary dome is a light emitter system 304 that is configured and positioned to generate and emit pulses of light through the aperture 312 or through the transparent dome of the housing 306 via one or more laser emitter chips or other light emitting devices. The light emitter system 304 may include any number of individual emitters (e.g., 8 emitters, 64 emitters, or 128 emitters). The emitters may emit light of substantially the same intensity or of varying intensities. The lidar system also includes a light detector 308 containing a photodetector or array of photodetectors positioned and configured to receive light reflected back into the system. The light emitter system 304 and light detector 308 would rotate with the rotating shell, or they would rotate inside the stationary dome of the housing 306. One or more optical element structures 310 may be positioned in front of the light emitter system 304 and/or the light detector 308 to serve as one or more lenses or waveplates that focus and direct light that is passed through the optical element structure 310.

One or more optical element structures 310 may be positioned in front of a mirror (not shown) to focus and direct light that is passed through the optical element structure 310. As shown below, the system includes an optical element structure 310 positioned in front of the mirror and connected to the rotating elements of the system so that the optical element structure 310 rotates with the mirror. Alternatively or in addition, the optical element structure 310 may include multiple such structures (for example lenses and/or waveplates). Optionally, multiple optical element structures 310 may be arranged in an array on or integral with the shell portion of the housing 306.

Lidar system 300 includes a power unit 318 to power the light emitting unit 304, a motor 316, and electronic components. Lidar system 300 also includes an analyzer 314 with elements such as a processor 322 and non-transitory computer-readable memory 320 containing programming instructions that are configured to enable the system to receive data collected by the light detector unit, analyze it to measure characteristics of the light received, and generate information that a connected system can use to make decisions about operating in an environment from which the data was collected. Optionally, the analyzer 314 may be integral with the lidar system 300 as shown, or some or all of it may be external to the lidar system and communicatively connected to the lidar system via a wired or wireless communication network or link.

Figure 4:
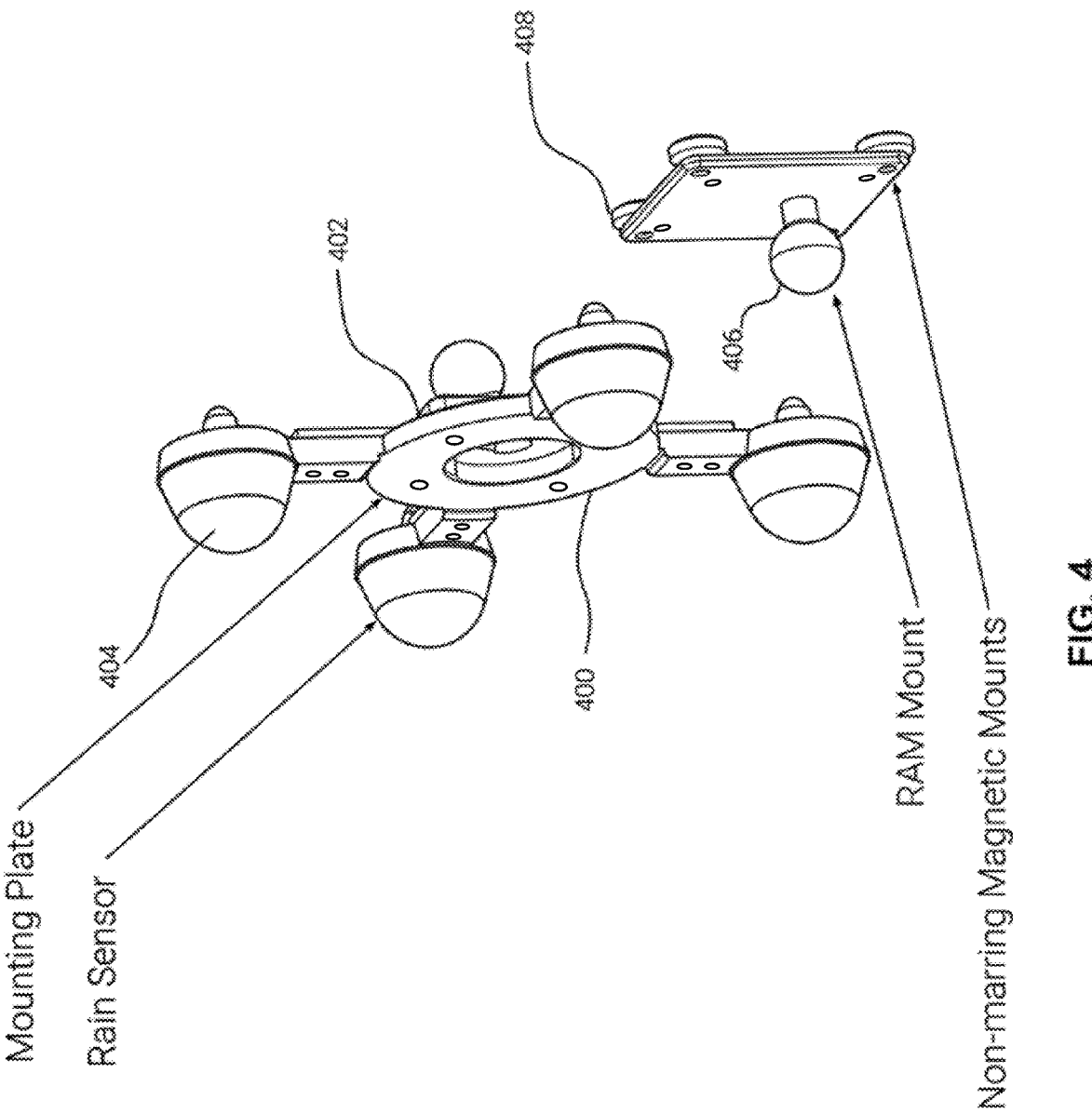
FIG. 4 illustrates a sensor array to be coupled to an AV, in accordance with aspects of the disclosure.

FIG. 4 illustrates a sensor array to be coupled to AV 102, in accordance with aspects of this disclosure. Sensor array 400 may include mounting plate 402 and rain sensors 404. Rain sensors 404 may be disposed around sensor array 400. Mounting plate 402 may be coupled to mounts 408 using RAM mount 406. RAM mount 406 may provide flexible positioning. Once coupled, sensor array 400 may be coupled to AV 102 using mounts 408. Mounts 408 may be non-marring magnetic mounts.

Rain sensors 404 may be used to collect precipitation data. As a non-limiting example, four rain sensors 404 may be disposed on sensor array 400. This way, sensor array 400 provides coverage of a large surface area. This provides a large sample size of precipitation data. Rain sensors 404 are spread out on sensor array 400 to provide a better average reading and less localized data. Additional or fewer rain sensors 404 may be disposed on sensory array 400.

Figure 5:
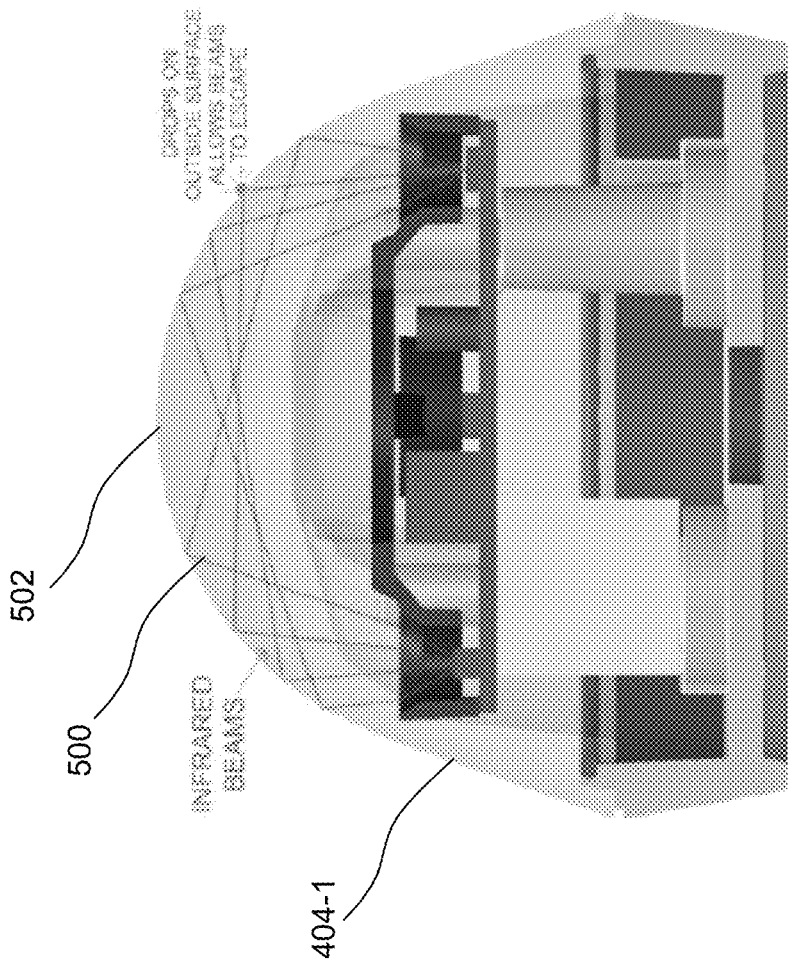
FIG. 5 illustrates an example rain sensor, in accordance with aspects of the disclosure.

FIG. 5 illustrates an example rain sensor, in accordance with aspects of this disclosure. Rain sensor 404-1 may be part of sensor array 400, as shown in FIG. 4. Rain sensor 404-1 may be an in-motion rain sensor. That is, rain sensor 404-1 may be configured to detect precipitation data while AV 102 is in-motion. Rain sensor 404-1 uses IR refraction to detect precipitation. In particular, rain sensor 404-1 emits IR beams 500 using IR transmitters. IR beams 500 bounce off of the lens of rain sensor 404-1. Precipitation on the outside of surface 502 of the lens refract IR beams 500 to escape. Refracting IR beams 500 decreases the intensity of the intensity of IR beams 500. Rain sensor 404-1 detects the decrease in intensity. Rain sensor 404-1 may use the decrease in intensity to determine droplet size and rain rate. As a non-limiting example, rain sensor 404-1 may be Rain Gauge Model RG-15.

Figure 6:
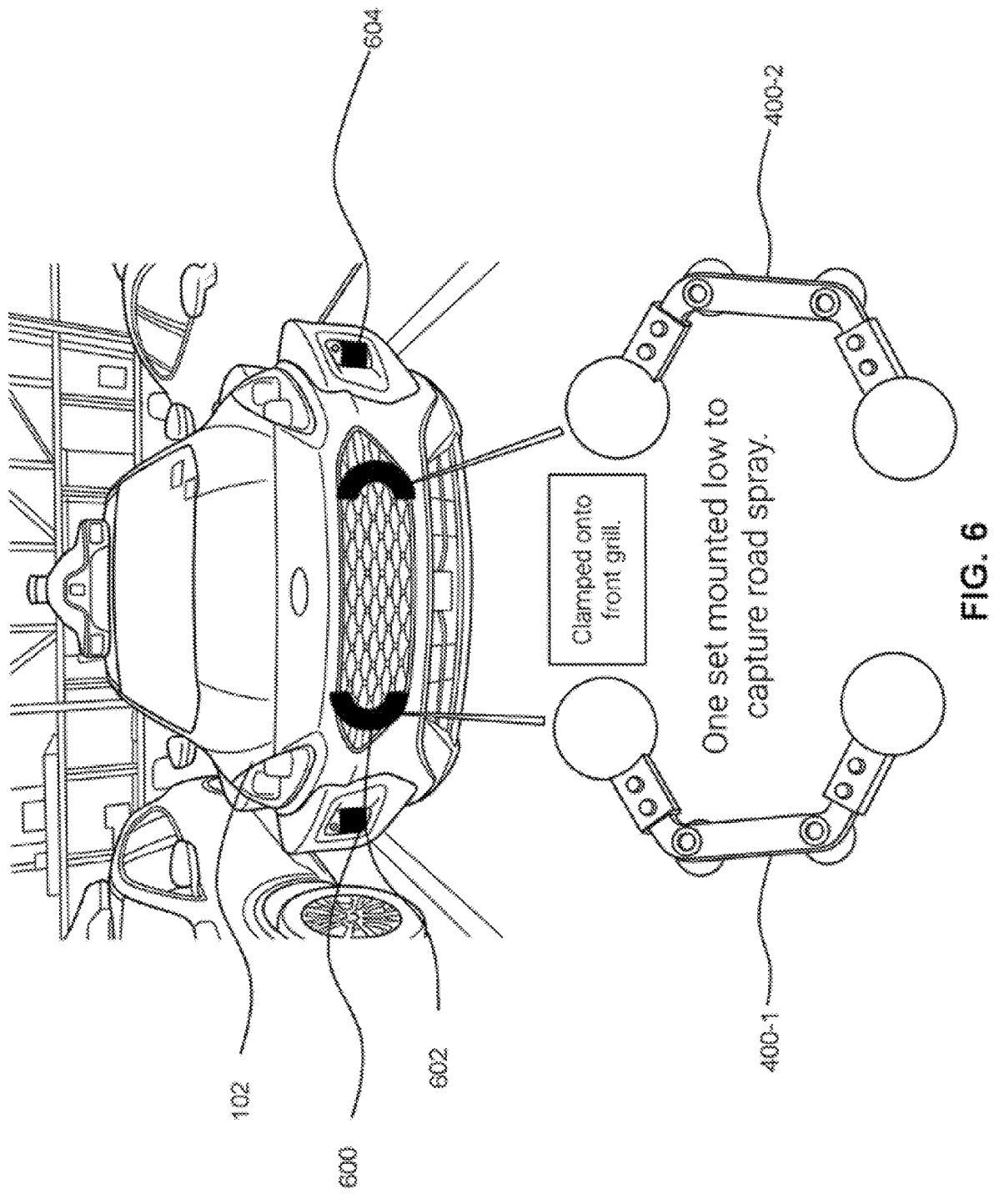
FIG. 6 illustrates an example sensor array being mounted to an AV, in accordance with aspects of the disclosure.

FIG. 6 illustrates an example sensor array being mounted to an AV, in accordance with aspects of this disclosure. Sensor arrays 400-1 and 400-2 may be mounted to front grill 602 of AV 102. Sensor arrays 400-1 and 400-2 may include rain sensors (e.g., rain sensor 404), or other precipitation related sensors. Sensors within a sensor array, such as sensor arrays 400-1 or 400-2 may be arranged accordingly to a predetermined topology, such as a rectangular shape, a circle, or any other regular geometric shape. This way, sensor arrays 400-1 and 400-2 may capture the precipitation data for the front of AV 102 and within proximity of sensors 600 and 604. The position of sensor array 400-1 and 400-2 may capture precipitation data associated with road spray on front grill 602. This precipitation may affect the manner in which AV 102 operates based on sensor data collected by sensors 600 and 604. Sensors 600 and 604 may be lidar sensors, or other sensors different from precipitation related sensors within sensor arrays 400-1 and 400-2. In addition, sensors 600 and 604 may be attached or installed on the vehicle by one way, and sensor arrays 400-1 and 400-2 may be installed on the vehicle in a different way. For example, sensors 600 and 604 may be installed on the vehicle in a more permanent way, and sensor arrays 400-1 and 400-2 may be installed in a less permanent way that can be removed with relative ease. An array of sensors, or a sensor array, such as sensor arrays 400-1 and 400-2, may be positioned within a predetermined distance of a respective lidar sensor, such as within 1 inch distance from the lidar sensor, or any other suitable distance. For example, sensor array 400-1 may be placed within 1 inch distance from lidar 600, and sensor array 400-2 may be placed within 1 inch distance from lidar 604, where the distance may be measured by a distance form lidar 600 to a center of sensor array 400-1, or by a distance from lidar 604 to a center of sensor array 400-2. In comparison, a distance between two different lidars, such as lidar 600 and lidar 604 may be much larger, e.g., 10 times larger than the distance between the sensor array 400-1 and lidar 600, or the distance between the sensor array 400-2 and lidar 604. By placing the sensor array close to the lidar, data collected by the sensor array can be more accurately related to data collected by the lidar, hence providing more accurate overall measurements of precipitation rate for controlling the function of the vehicle.

Figure 7:
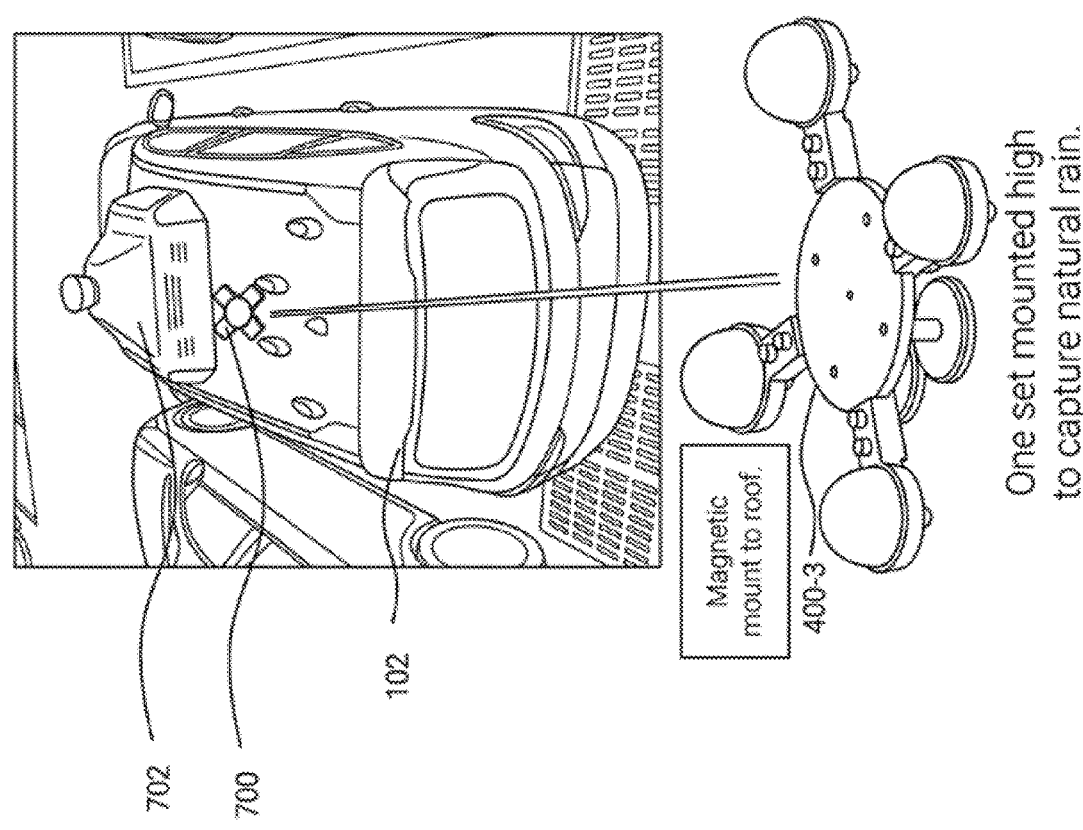
FIG. 7 illustrates an example sensor array being mounted to an AV, in accordance with aspects of the disclosure.

FIG. 7 illustrates an example sensor array being mounted to an AV, in accordance with aspects of this disclosure. Sensor array 400-3 may be mounted to roof 700 of AV 102. Sensor array 400-3 may include rain sensors (e.g., rain sensor 404). This way, sensor array 400-3 may capture the precipitation data for the top of the AV 102 and within proximity of sensor 702. The position of sensor array 400-3 may capture precipitation data associated with natural rain. This precipitation may affect the manner in which AV 102 operates based on sensor data collected by sensor 702. Sensor 702 may be lidar sensors.

In some embodiments, sensor arrays 400-1 and 400-2 may be mounted to front grill 602 and sensor array 400-3 may be mounted to roof 700 at the same time. This allows for capturing precipitation data associated with road spray on front grill 602 and natural rain on roof 700. The precipitation data captured by sensor arrays 400-1, 400-2, and

400-3 may be used to validate the sensor data collected by sensors 600, 604, and 702. Furthermore, the precipitation data captured by sensor arrays 400-1, 400-2, and 400-3 may be used to control one or more functions of AV 102.

Figure 8:
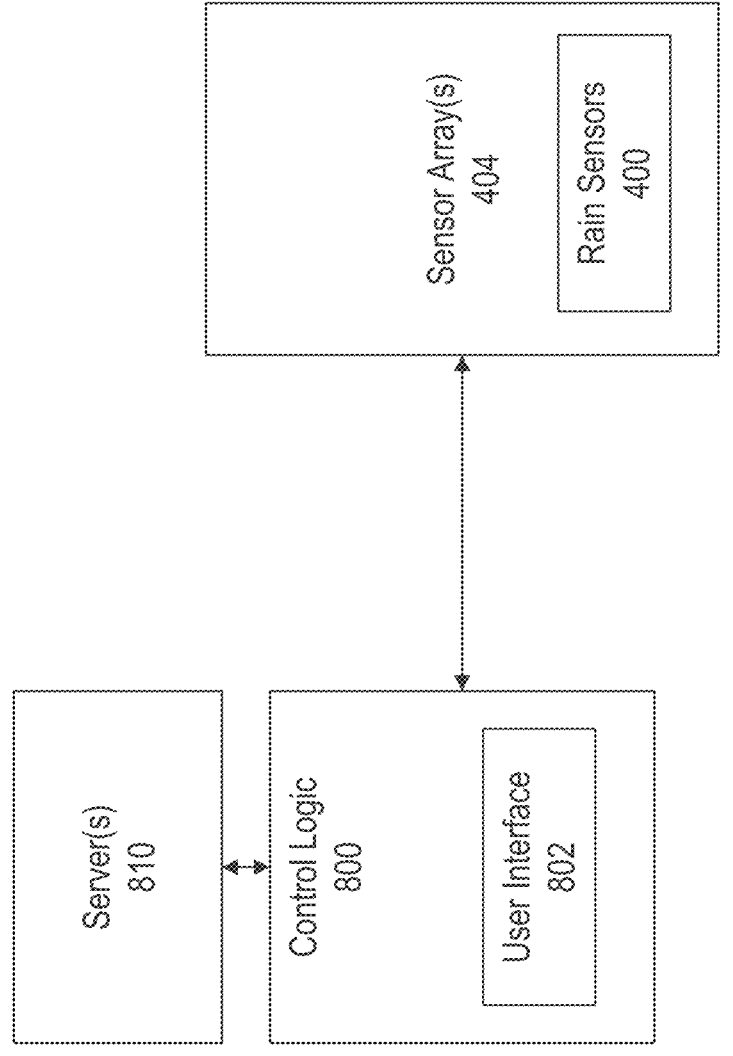
FIG. 8 illustrates an exemplary architecture of a system for determining precipitation data, in accordance with aspects of the disclosure.

FIG. 8 illustrates the architecture of the system for determining precipitation data, in accordance with aspects of this disclosure. The architecture may include sensor array(s) 404, control logic 800, and server(s) 810. Control logic 800 may be part of AV 102. Control logic 800 may be in communication with sensor arrays 400 and server 810.

Sensor array 400 may include rain sensors 404 to capture precipitation data. Several sensor arrays 400 may be mounted to AV 102. For example, sensor arrays 400 may be mounted to the roof, front grill, bumper, etc. Sensor arrays 400 may be disposed within a predetermined proximity to sensors (e.g., lidar sensors) on AV 102.

AV 102 may be operated in test conditions with sensor arrays 400 to capture precipitation data using rain sensors 400 and sensors on AV 102. Control logic 800 may be located in AV 102. Control logic 800 may include user interface 802. In this regard, AV 102 may include a display. Control logic 800 may output user interface 802 on the display. User interface 802 may output precipitation data collected by rain sensors 404.

The precipitation in the test conditions may be simulated. Control logic 800 collects pings from rain sensors 400 in 0.001 inch buckets. Control logic 800 calculates rain rate or precipitation rate using a rolling average of the available rain sensors 404 and output on a user interface 404. The average is calculated per sensor array 400. For example, if a sensory array 400 includes 4 rain sensors 404 with a 10-sample rolling average, control logic 800 averages 40 data points. The precipitation rate may be calculated using other approaches, for example based on an average of the precipitation data received from the array of sensors, which can be a weighted average of precipitation data collected at a same time, or over a time interval. Various calculations may be applied based on the applications of interest to determine the applicable precipitation rate.

The testing conditions may include in-motion testing and wind tunnel testing. In-motion testing may be used to validate in-motion performance of AV 102's rain sensors 404, measure change in rain rate due to vehicle speed, and characterize road spray to speed/following distance. Wind tunnel testing may be used to validate simulated rain for validation testing and correlate wind tunnel rain rates back to on-road testing.

As a non-limiting example, in one test condition the road may be wet, however, no other precipitation may be simulated. In this test condition, sensor arrays 400 may detect road spray on the bumper or front grill. Moreover, the test condition may be used to determine the effect of AVs 102 causing road spray while in-motion. As such, two or more AVs 102 may be operated in the test condition.

The precipitation data collected by sensor arrays 400 may include rate of road spray based on distance and speed of AV 102. Rain sensors 404 may transmit the precipitation data to control logic 800. Control logic 800 may transmit the precipitation data to server 810.

Figure 9:
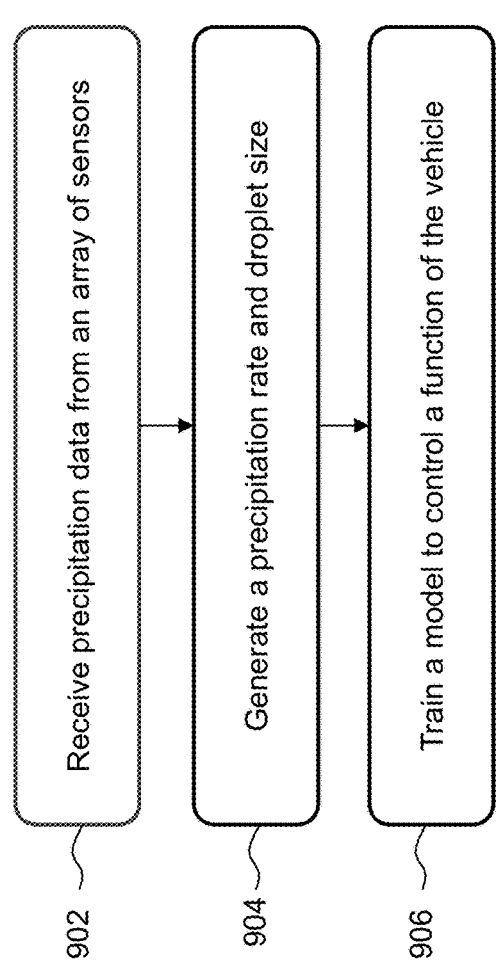
FIG. 9 is a flowchart illustrating a process for determining precipitation data with aspects of the disclosure.

FIG. 9 is a flowchart illustrating a process for determining precipitation data with aspects of the disclosure. Process 900 may be described with respect to FIG. 8, however, is not limited to that embodiment.

In 902, precipitation data captured by sensor array 400 is received. For example, server 810 may receive the precipitation data from control logic 800, which receives the precipitation data from rain sensors 404.

In 904, the precipitation rate may be determined. Server 810 may determine the precipitation rate and droplet size based on the precipitation data.

In 906, a model for controlling a function of AV 102 is trained using the precipitation rate and droplet size. For example, server 810 may use the precipitation rate and droplet size to validate sensor data (e.g., lidar sensor data with respect to precipitation). Furthermore, server 810 may use the precipitation rate and droplet size to determine that road spray caused by different types of AVs 102 traveling at various speeds. Server 810 may use the precipitation rate and droplet size to determine difficulty of a first AV 102 traveling behind a second AV 102 based on the road spray. In this regard, server 810 may use the precipitation rate and droplet size to generate a training dataset, and train models, such as machine learning models, implemented by AV 102. The models may be associated with controlling the operation of AV 102. The precipitation data may be used to train models configured to control the AV 102's speed, direction, windshield wipers, traction control, etc. According to aspects of the disclosure, the machine learning model and the function of the vehicle correspond to a position of the array of sensors on the vehicle. In this approach, different positions of the array of sensors may be associated with different machine learning models, which may be applied for different functions.

Supporting Documentation for Context:

Step 1: Rain Intensity Quantification

The first step in training a model to determine the impact of rain is to collect samples of rain and label important characteristics. (1)

Some sources may directly measure the rain; like the localized rain sensor. Some sources indirectly measure the rain; like the windshield wiper rate or the rain rate measured hourly at a nearby weather station.

Figure 11:
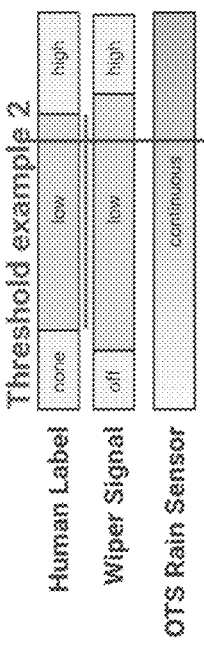
FIG. 11 is an example illustrating of different categories for sensed data.

Different sources provide different resolutions of data. Some provide continuous data (ie: 0, 0.1, 0.2, 0.3, . . . ) while others only provide categories or buckets (ie: wiper speed of off, low, or high). An example of such categories or buckets are shown in FIG. 11.

With categorized or bucketed data multiple data sources can be used to narrow down the resolution. Having continuous data allows a specific amount to be known anywhere along the scale. The localized rain sensor, which are described in the current application, provides high resolution data (continuous) with a direct measurement of the rain, the combination of which reduces the amount of noise.

Step 2: Labeling of Data/Samples

In some embodiments, there can be two methods for labeling the data that trains the machine learning model:

Labeling the data/samples within buckets in order to train the model to predict which bucket the new data falls into In-scope vs out-of-scope None, low, medium, high 0-1, 2-3, 4-5

Labeling the data/samples with continuous data in order to train the model to predict the original measurement along a continuous measurement.

Analogous to Using Data Points to Create a Trend Line Equation

Method #1 can use continuous or bucketed data, while Method #2 can use continuous data.

Even when using Method #1, continuous data allows a finer resolution of the bucket size (less noise/inaccuracy).

When setting a threshold, having continuous data can dramatically impact where the threshold can be. Looking at the examples above; if the blue line is the actual reading, the red line is the accuracy one can have with the two bucketed sources. The error is very small in example 1, but is very large in example 2. Whereas the continuous data always has a high degree of accuracy.

Step 3: Training of Machine Learning Model

In this stage, the machine learning model can be trained to have as many factors labeled as possible to potentially train and identify different models to create better predictions for each case. Having continuous, primary source data can help reduce the number of samples that are incorrectly labeled, making the machine learning better at predicting the correct value.

Step 4: Verification of the False Positive/False Negative or Precision/Recall

When verifying that the machine learned model is correctly identifying the rain rate or rain rate bucket/category, having a continuous measurement system dramatically reduces the noise in the measurement, ensuring that the passes are truly passes and the fails are truly fails.

Within the scope of self-driving cars identifying in-scope and out-of-scope rain:

A false negative means that the vehicle is driving in out-of-scope rain

A false positive means that the vehicle will perform an stop when not needed

Both false positives and false negatives can increase the risk of a collision.

If the amount of error is known, a buffer could be used to bias towards a false positive case, but that reduces the amount of rain the vehicle can operate in, meaning more down time and a higher chance of rear end collisions, if the reaction is aggressive and sudden.

Figure 10:
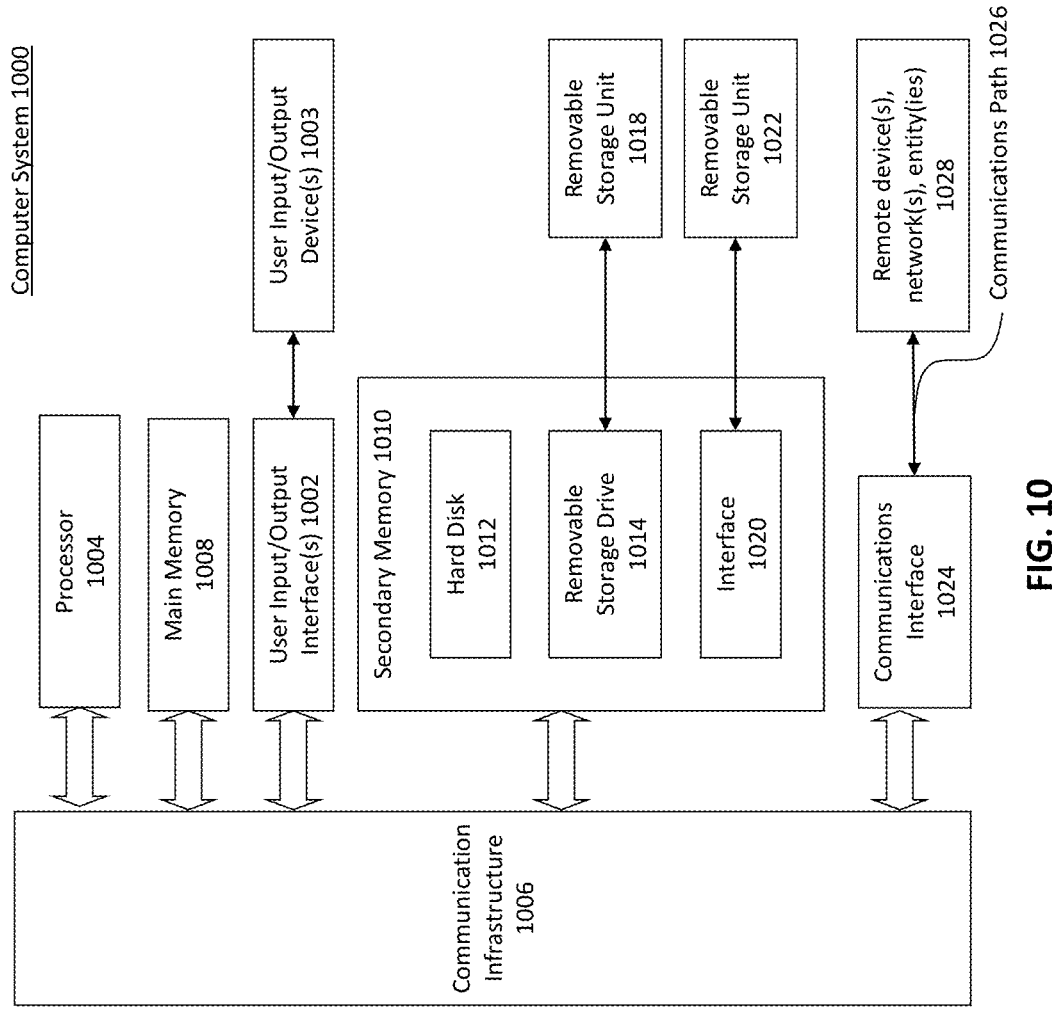
FIG. 10 is an example computer system useful for implementing various embodiments.

Various embodiments can be implemented, for example, using one or more computer systems, such as computer system 1000 shown in FIG. 10. Computer system 1000 can be any computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
generating a precipitation rate based on an average of precipitation data from an array of a plurality of precipitation related sensors disposed on a vehicle according to a topology and positioned so that a center of the topology is within a predetermined distance of a respective lidar sensor of a set of lidar sensors disposed on the vehicle, wherein a distance between two different lidar sensors of the set of lidar sensors is larger than a distance between the center of the topology to the respective lidar sensor;
generating a training dataset based on the precipitation rate; and
training a machine learning model configured to control a function of the vehicle using the training dataset.

2. The computer-implemented method of claim 1, further comprising validating data collected using the set of lidar sensors based on the precipitation rate.

3. The computer-implemented method of claim 1, wherein the machine learning model and the function of the vehicle correspond to a position of the array of sensors on the vehicle.

4. The computer-implemented method of claim 1, wherein the training dataset is further based a droplet size of precipitation determined based on the precipitation data.

5. The computer-implemented method of claim 1, further comprising collecting the precipitation data while the vehicle is in-motion.

6. The computer-implemented method of claim 1, further comprising collecting the precipitation data while the vehicle is in a wind tunnel.

7. The computer-implemented method of claim 1, further comprising detecting precipitation that interrupts an infrared beam bounced off of a lens.

8. A system, the system comprising:

a memory; and a processor coupled to the memory, wherein the processor is configured to:

generate a precipitation rate based on an average of precipitation data from an array of a plurality of precipitation related sensors disposed on a vehicle according to a topology and positioned so that a center of the topology is within a predetermined distance of a respective lidar sensor of a set of lidar sensors disposed on the vehicle, wherein a distance between two different lidar sensors of the set of lidar sensors is larger than a distance between the center of the topology to the respective lidar sensor;

generate a training dataset based on the precipitation rate; and train a machine learning model to control a function of the vehicle during precipitation using the precipitation rate.

9. The system of claim 8, wherein the precipitation rate is used to validate data collected using the set of lidar sensors.

10. The system of claim 8, wherein the machine learning model and the function correspond to a position of the array of sensors on the vehicle.

11. The system of claim 8, wherein the processor is further configured to:

determine a droplet size of precipitation based on the precipitation data; and train the machine learning model to control the function of the vehicle during the precipitation using the droplet size.

12. The system of claim 8, wherein the vehicle is in-motion while the array of sensors collects the precipitation data.

13. The system of claim 8, wherein the vehicle is in a wind tunnel while the array of sensors collects the precipitation data.

14. The system of claim 8, wherein a sensor of the array of sensors bounces an infrared beam off of a lens and the sensor is configured to detect precipitation that interrupts the infrared beam.

15. A non-transitory computer-readable medium having instructions stored thereon that, when executed by at least one computing device, cause the at least one computing device to perform operations, the operations comprising:

generating a precipitation rate based on an average of precipitation data from an array of a plurality of precipitation related sensors disposed on a vehicle according to a topology and positioned so that a center of the topology is within a predetermined distance of a respective lidar sensor of a set of lidar sensors disposed on the vehicle, wherein a distance between two different lidar sensors of the set of lidar sensors is larger than a distance between the center of the topology to the respective lidar sensor;

generating a training dataset based on the precipitation rate; and training a model to control a function of the vehicle during precipitation using the precipitation rate.

16. The non-transitory computer-readable medium of claim 15, wherein the precipitation rate is used to validate data collected using the set of lidar sensors.

17. The non-transitory computer-readable medium of claim 15, wherein the model and the function correspond to a position of the array of sensors on the vehicle.

18. The non-transitory computer-readable medium of claim 15, wherein the operations further comprise:

determining a droplet size of precipitation based on the precipitation data; and training the model to control the function of the vehicle during the precipitation using the droplet size.

19. The non-transitory computer-readable medium of claim 15, wherein the vehicle is in-motion while the array of sensors collects the precipitation data.

20. The non-transitory computer-readable medium of claim 15, wherein the vehicle is in a wind tunnel while the array of sensors collects the precipitation data.

\* \* \* \* \*